United States Patent [19]
Graf et al.

[11] Patent Number: 5,868,905
[45] Date of Patent: Feb. 9, 1999

[54] PAPER-MAKING MACHINE INCLUDING A DEAERATOR FOR A FIBER SUSPENSION

[75] Inventors: Edwin X. Graf, Menasha, Wis.; Clark J. Krystek, Plainville, Mass.

[73] Assignee: Voith Sulzer Paper Technology North Amrica Inc., Appleton, Wis.

[21] Appl. No.: 844,939

[22] Filed: Apr. 23, 1997

[51] Int. Cl.$^6$ .............................. D21F 1/02; B01D 19/00
[52] U.S. Cl. ........................... 162/380; 96/204; 162/336; 162/381
[58] Field of Search ................................. 162/380, 381, 162/336, 339; 96/204; 95/260

[56] References Cited

U.S. PATENT DOCUMENTS

| Re. 29,472 | 11/1977 | Kaiser | 162/380 |
|---|---|---|---|
| 2,931,503 | 4/1960 | Clark | 162/380 |
| 3,206,917 | 9/1965 | Kaiser et al. | 162/380 |
| 4,238,208 | 12/1980 | Frykhult et al. | 162/380 |

OTHER PUBLICATIONS

MacDonald et al. "Paper making and Paper Board Making" McGraw Hill Book Company pp. 227–230 1970.

*Primary Examiner*—Karen M. Hastings
*Attorney, Agent, or Firm*—Taylor & Associates, P.C.

[57] ABSTRACT

The invention is directed to a paper-making machine for making a paper web from a fiber suspension. The paper-making machine includes a headbox having an entrance, a fluid conduit connected to the headbox entrance, and a deaeration device with an exit connected to the fluid conduit. The deaeration device includes a housing and a pipe. The housing including an inner surface defining an inner chamber. The pipe is disposed at least partially within the housing and is configured to receive the fiber suspension. The pipe has a plurality of outlets disposed within the inner chamber of the housing. Each of the outlets is configured to output a stream of the fiber suspension against and at an acute angle relative to the inner surface of the inner chamber. A vacuum source is connected to the housing and is in fluid communication with the inner chamber.

15 Claims, 2 Drawing Sheets

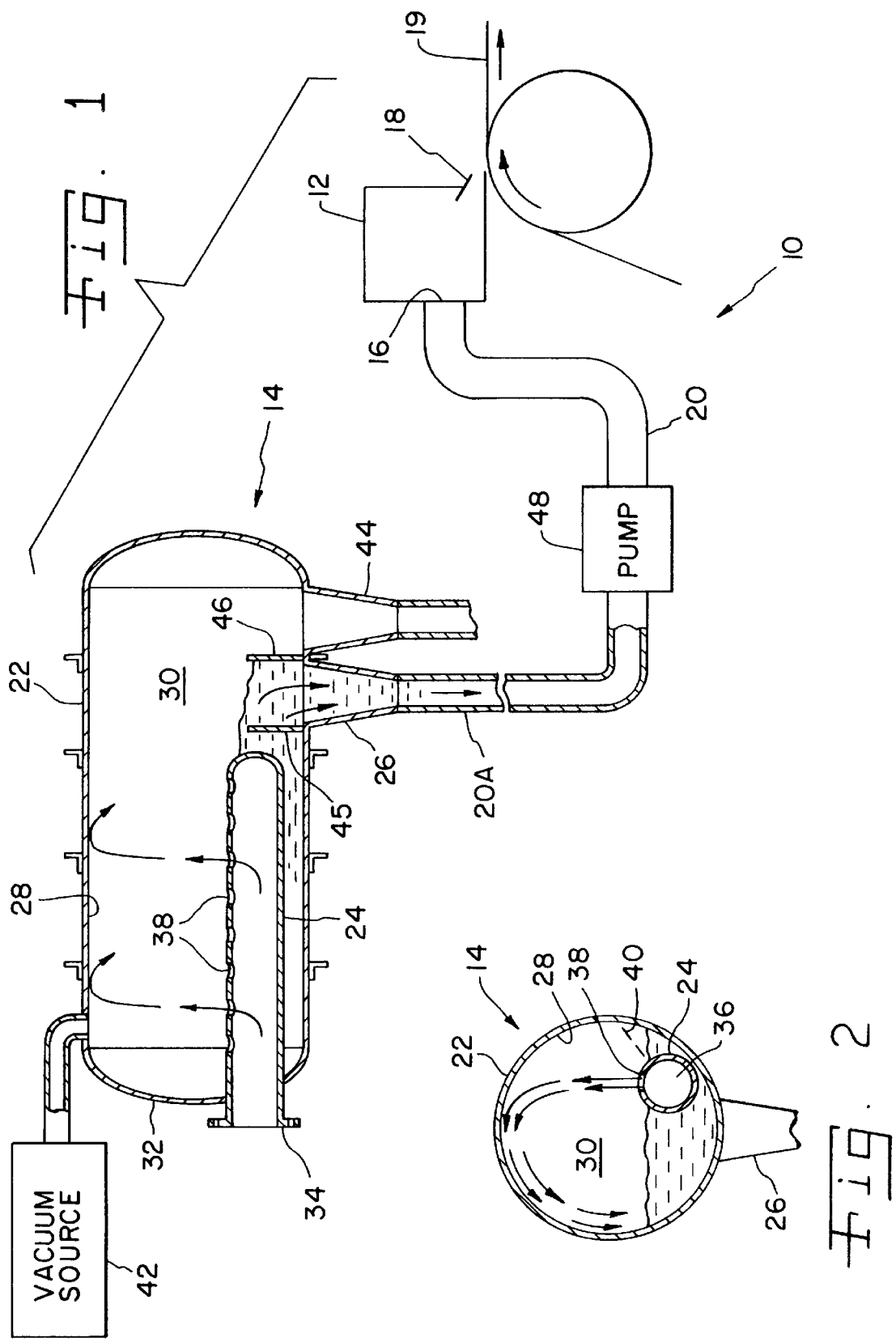

PAPER-MAKING MACHINE INCLUDING A DEAERATOR FOR A FIBER SUSPENSION

BACKGROUND OF THE INVENTION

1. Field of the Invention

The present invention relates to paper machines, and, more particularly, to paper machines including a deaerator for the fiber suspension which is connected to an inlet side of a headbox.

2. Description of the Related Art

A paper making-machine is used for making a fiber web from a fiber suspension. The fiber suspension is introduced into a headbox, such as a valley or a hydraulic headbox, at the wet end of the machine. The headbox discharges the fiber suspension with a particular cross-sectional profile onto a forming fabric on the wet end of the machine. The fiber suspension is typically in the form of fibers, such as wood fibers, which are suspended in water.

It is necessary to treat the fiber suspension which is introduced into the headbox such that the fiber web produced as the end product is of a particular quality with minimal defects. For example, the fiber suspension may be cleaned and bleached prior to introduction into the headbox. Another factor which tends to affect the quality of the fiber web is the inclusion of air in the fiber suspension as a result of various treating processes associated with the fiber suspension prior to being introduced into the headbox. Air within the fiber suspension is undesirable from a manufacturing and efficiency standpoint. For example, the air within the fiber suspension occupies a certain volume of the fiber suspension and interferes with drainage of the fiber suspension after being discharged from the headbox onto the forming fabric.

It is known to provide a deaeration unit which is connected to the inlet side of the headbox for the purpose of removing air from the fiber suspension. Such a deaeration unit typically is in the form of a large tank having a vacuum applied thereto using a vacuum source. An air space exists within the tank above the fiber suspension flowing therethrough. The vacuum within the tank causes the air bubbles within the fiber suspension to expand and rise to the top of the fiber suspension. The air bubbling to the top of the fiber suspension is drawn away from the tank using the vacuum source connected therewith.

A problem with a deaeration tank as described above is that only the top surface of the fiber suspension is exposed to the vacuum pressure. In other words, only a relatively small surface area of the fiber suspension when compared with the overall volume of the fiber suspension is directly exposed to the vacuum pressure. The efficiency of such a deaeration tank is therefore somewhat limited.

What is needed in the art is a deaeration unit which provides improved deaeration of the fiber suspension which is introduced into the headbox.

SUMMARY OF THE INVENTION

The present invention provides a deaeration device for use with a paper machine. The deaeration device includes a housing defining an inner chamber with an inner surface. The fiber suspension is jetted against the arcuate top surface at an acute angle and travels around the inner surface and out an outlet of the deaeration device.

The invention comprises, in one form thereof, a paper-making machine for making a paper web from a fiber suspension. The paper-making machine includes a headbox having an entrance, a fluid conduit connected to the headbox entrance, and a deaeration device with an exit connected to the fluid conduit. The deaeration device includes a housing and a pipe. The housing includes an arcuate inner surface defining an inner chamber. The pipe is disposed at least partially within the housing and is configured to receive the fiber suspension. The pipe has a plurality of outlets disposed within the inner chamber of the housing. Each of the outlets is configured to output a stream of the fiber suspension against and at an acute angle relative to the inner surface of the inner chamber. A vacuum source is connected to the housing and is in fluid communication with the inner chamber.

An advantage of the present invention is that the fiber suspension travels over a relatively long travel length around the arcuate inner surface of the inner chamber, thereby increasing the surface area and time in which the fiber suspension is exposed to the vacuum pressure, resulting in an improved deaeration of the fiber suspension.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 is a schematic view of a portion of a paper-making machine including an embodiment of a deaeration device of the present invention;

FIG. 2 is an end view of the deaeration device shown in FIG. 1; and

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 3:
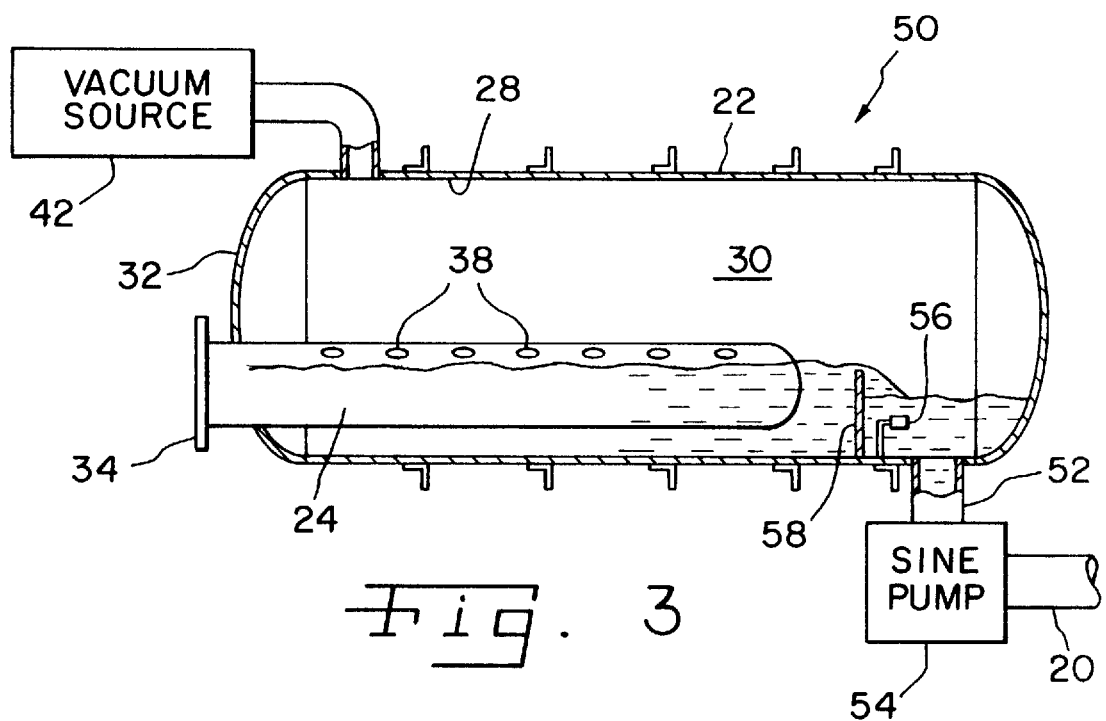
FIG. 3 is a schematic view of a portion of a paper-making machine including another embodiment of a deaeration device of the present invention.

Referring now to the drawings and more particularly to FIGS. 1 and 2, there is shown a portion of a paper-making machine 10 including a headbox 12 and an embodiment of a deaeration device 14 of the present invention.

The term "paper-making machine" or the like, as used herein, is used broadly and intended to mean any machine used for making a fiber web such as, e.g., a fiber web for the production of paper, cardboard or carton.

Headbox 12 is shown schematically in FIGS. 1 and 2. Headbox 12 receives the processed fiber suspension at an entrance 16 and discharges the fiber suspension from a discharge nozzle 18 onto a forming fabric 19 at the wet end of the paper-making machine. Headbox 12 may be any type of a headbox, such as a hydraulic or valley headbox.

Deaeration device 14 is used for deaerating the fiber suspension which is supplied to headbox 12 via a fluid conduit 20. Deaeration device 14 includes a housing 22 and a pipe 24. Housing 22 has an exit 26 which is connected to fluid conduit 20, which in turn is connected to inlet 16 of headbox 12. Housing 22 also includes an inner surface 28 which defines an inner chamber 30. Inner chamber 30 has a substantially circular cross-section (FIG. 2), with exit 26 being disposed at the bottom of inner chamber 30.

Pipe 24 extends through an end cap 32 of housing 22 toward and into inner chamber 30. Pipe 24 includes a flange connection 34 which is configured for connection with an upstream portion of the stock preparation and supply system such that the fiber suspension is supplied to an interior 36 of pipe 24.

Pipe 24 also includes a plurality of outlets 38 which are disposed within inner chamber 30 of housing 22. Each of outlets 38 are configured to output a stream of the fiber suspension against and at an acute angle relative to inner surface 28 of housing 22. In the embodiment shown in FIGS. 1 and 2, outlets 38 are configured to output a plurality of respective streams of the fiber suspension in a generally vertical direction against inner surface 28. However, outlets 38 may be configured to output respective streams of the fiber suspension at different acute angles relative to inner surface 28. For example, outlets 28 may be configured to output respective streams of the fiber suspension at a greater acute angle against inner surface 28, as indicated by dashed line 40 in FIG. 2. Moreover, in the embodiment of deaeration device 14 shown in FIG. 2, pipe 24 is shown offset (i.e., to the right in FIG. 2) relative to a vertical axis passing through housing 22. The actual value of the acute angle between the output streams of the fiber suspension from outlets 38 and inner surface 28 also varies dependent upon the exact position of pipe 24 within housing 22. Thus, dependent upon the rotational orientation of outlets 38 and the exact positioning of pipe 24 within housing 22, the acute angle between the streams of fiber suspension and inner surface 28 may vary from between approximately 10° and 80° relative to a tangent to the impingement locations of the fiber suspension on inner surface 28.

Outlets 38 are formed as substantially cylindrical openings in pipe 24 in the embodiment of deaeration device 14 shown in FIGS. 1 and 2. However, outlets 38 may be formed with any suitable shape to discharge a stream with a desired pattern onto inner surface 28 of housing 22. For example, outlets 38 may be formed such that the fiber suspension is discharged onto inner surface 28 in a fan-shaped stream. Moreover, outlets 38 may be step drilled with a number of different diameter stepped openings to provide a stream of the fiber suspension with a desired pattern for impingement upon inner surface 28.

From the foregoing description, it is apparent that pipe 24 defines a device for receiving a fiber suspension and jetting the fiber suspension from outlets 38, whereby the fiber suspension impinges upon inner surface 28 at an acute angle relative thereto. It is to be understood, however, that other equivalent-type devices for deaerating the fiber suspension are also possible. For example, it is possible to provide a first larger diameter pipe with a second, slightly smaller diameter pipe disposed therein. The fiber suspension may be received within the annular space between the two pipes and discharged from a plurality of outlets formed in the inner pipe against an inner surface of the inner pipe defining the inner chamber. Other variants are also possible.

A vacuum source 42 is connected to housing 22 and disposed in fluid communication with inner chamber 30. Vacuum source 42 may be, e.g., in the form of a vacuum pump which draws a desired vacuum on inner chamber 30 of housing 22. For example, vacuum source 42 may be configured to effect a vacuum within inner chamber 30 of between approximately 20 and 29 inches Mercury. Of course, the particular vacuum pressure within inner chamber 30 may vary dependent upon geometric and operational characteristics associated with deaeration device 14.

Pipe 24, defining a fiber suspension receiving and jetting device, allows a greater surface area of the fiber suspension to be exposed to the vacuum pressure within inner chamber 30, thus improving the deaeration of the fiber suspension. The larger surface area which is exposed to the vacuum pressure and the longer time period during which the surface area is exposed to the vacuum pressure results in more air bubbles being drawn to the surface of the fiber suspension and removed from inner chamber 30 via vacuum source 42. The present invention therefore provides a simple, economical and low maintenance alternative for deaeration of the fiber suspension prior to introduction into headbox 12.

Deaeration device 14 may also include an overflow outlet 44 connected to housing 22. Fiber suspension which rises above a wall 46 within inner chamber 30 flows into overflow outlet 44 for appropriate recycling, etc.

A centrifugal pump 48 is connected to fluid conduit 20, and is positioned between deaeration device 14 and headbox 12. Fluid conduit 20 includes a drop leg 20A having a length of approximately 40 to 50 feet which functions to provide a sufficient pressure head to adequately supply the fiber suspension to centrifugal pump 48. To wit, centrifugal pump 48 may experience cavitation if the fiber suspension is not supplied under positive pressure thereto. Drop leg 20A of fluid conduit 20 provides a pressure head at centrifugal pump 48 of known magnitude, and thus a positive pressure within the fiber suspension supplied to the inlet of centrifugal pump 48. Of course, the length of drop leg 20A will vary dependent upon a flow rate through centrifugal pump 48, the diameter of drop leg 20A, etc.

During use, fiber suspension enters pipe 24 and is discharged under pressure against and at an acute angle relative to inner surface 28 of housing 22. The fiber suspension flows around a substantial portion of arcuate inner surface 28. The greater surface area of the fiber suspension which is in contact with the vacuum within inner chamber 30, and the longer time period during which the fiber suspension is exposed to the vacuum pressure within inner chamber 30, results in adequate deaeration of the fiber suspension. The deaerated fiber suspension flows over wall 45 and out through exit 26, drop leg 20A, centrifugal pump 48, fluid conduit 20 and into entrance 16 of headbox 12. The deaerated fiber suspension is then discharged from discharge nozzle 18 onto forming fabric 19 at the wet end of the paper-making machine.

Referring now to FIG. 3, there is shown a schematic view of another embodiment of a deaeration device 50 of the present invention. Deaeration device 50 includes a housing 22, a pipe 24 disposed partially therein, and a vacuum source 42, similar to the embodiment of deaeration device 14 described above with reference to FIGS. 1 and 2. However, deaeration device 50 includes a single exit 52 which is connected to a positive displacement pump 54. In the embodiment shown, positive displacement 54 is in the form of a sine pump 54 with known output characteristics. Sine pump 54, by virtue of being a positive displacement pump, does not suffer from cavitation problems associated with a centrifugal pump 48 of conventional design as described above with reference to the embodiment of deaeration device 14 shown in FIGS. 1 and 2. Accordingly, exit 52 need not be connected with a long drop leg for supplying a fiber suspension under positive pressure to sine pump 54. Rather, the vertical drop distance to the inlet of sine pump 54 is only that necessary for clearance of exit 52 between housing 22 and sine pump 54. For example, the vertical drop distance may be between 1 to 5 between a bottom surface (not numbered) of housing 22 and sine pump 54.

Eliminating the long drop leg between housing 52 and sine pump 54 results in a substantial decrease in the amount of space which is required for placement of the various parts associated with deaeration device 50. This in turn allows housing 22 and sine pump 54 to be placed relatively close to each other, resulting in a more compact unit.

A sensor 56 may be disposed within inner chamber 30, on a downstream side of wall 58 for controlling the operational speed of sine pump 54, dependent upon the fluid height of the fiber suspension on a downstream side of wall 58.

Operation of deaeration device 50 is very similar to the operation of deaeration device 14 described above. However, the deaerated fiber suspension flows through exit 52 and into sine pump 54 without flowing through a long, vertical drop leg.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A paper-making machine for making a paper web from a fiber suspension, said paper-making machine comprising:

a headbox having an entrance;

a fluid conduit connected to said entrance of said headbox;

a deaeration device including a housing and a single pipe, said housing having an exit connected to said fluid conduit, said housing including an arcuate inner surface defining an inner chamber, said pipe disposed at least partially within said housing and being configured to receive the fiber suspension, said pipe having a plurality of outlets disposed within said inner chamber of said housing and entirely to one side of a vertical plane longitudinally bisecting said inner chamber, each said outlet being configured to output a stream of the fiber suspension against a portion of said inner surface on said one side of said vertical plane and at a substantially equal, upwardly directed and predetermined acute angle relative to said inner surface; and a vacuum source connected to said housing and in fluid communication with said inner chamber.

2. The paper-making machine of claim 1, wherein said inner chamber has a substantially circular cross-section and said housing exit is disposed at a bottom of said inner chamber.

3. The paper-making machine of claim 1, further comprising a positive displacement pump connected to said fluid conduit and positioned between said deaeration device and said headbox.

4. The paper-making machine of claim 3, wherein said positive displacement pump comprises a sine pump.

5. The paper-making machine of claim 1, wherein said vacuum source is configured to effect a vacuum within said inner chamber of between approximately 20 and 29 inches Mercury.

6. The paper-making machine of claim 1, wherein each said outlet is configured to output a stream of the fiber suspension at an acute angle of between approximately 10° and 80° relative to said inner surface.

7. A paper-making machine for making a paper web from a fiber suspension, said paper-making machine comprising:

a headbox having an entrance;

a fluid conduit connected to said entrance of said headbox;

a deaeration device including a housing having an exit connected to said fluid conduit, said housing including an arcuate inner surface defining an inner chamber, said deaeration device further including means, defining a plurality of outlets within said inner chamber, for receiving the fiber suspension and jetting the fiber suspension from said outlets, said receiving and jetting means being disposed entirely to one side of a vertical plane longitudinally bisecting said inner chamber, whereby substantially all of the fiber suspension impinges upon a portion of said inner surface on said one side of said vertical plane at a same predetermined, acute angle relative to said inner surface; and a vacuum source connected to said housing and in fluid communication with said inner chamber.

8. The paper-making machine of claim 7, wherein said receiving and jetting means comprises a pipe disposed at least partially within said housing.

9. The paper-making machine of claim 7, wherein said receiving and jetting means is disposed at least partially within said inner chamber.

10. The paper-making machine of claim 7, wherein said inner chamber has a substantially circular cross-section and said housing exit is disposed at a bottom of said inner chamber.

11. The paper-making machine of claim 7, further comprising a positive displacement pump connected to said fluid conduit and positioned between said deaeration device and said headbox.

12. The paper-making machine of claim 11, wherein said positive displacement pump comprises a sine pump.

13. The paper-making machine of claim 7, wherein said vacuum source is configured to effect a vacuum within said inner chamber of between approximately 20 and 29 inches Mercury.

14. The paper-making machine of claim 7, wherein each said outlet is configured to output a stream of the fiber suspension at an acute angle of between approximately 10° and 80° relative to said inner surface.

15. The paper-making machine of claim 7, wherein said same predetermined, acute angle is such that substantially all of the fiber suspension flows from said one side of said vertical plane to an other side of said vertical plane along said inner surface of said housing.

* * * * *

UNITED STATES PATENT AND TRADEMARK OFFICE
CERTIFICATE OF CORRECTION

PATENT NO. : 5,868,905
DATED : February 9, 1999
INVENTOR(S) : Edwin X. Graf and Clark J. Krystek It is certified that error appears in the above-identified patent and that said Letters Patent is hereby corrected as shown below:

<u>Column 5</u>

Line 2, after "5" insert --feet-- therefore.

Signed and Sealed this

Twentieth Day of July, 1999

Attest:

Q. TODD DICKINSON

*Attesting Officer*   *Acting Commissioner of Patents and Trademarks*